United States Patent
Ogawa et al.

(10) Patent No.: US 6,818,287 B1
(45) Date of Patent: Nov. 16, 2004

(54) LIGHT SHIELDING BLADE MATERIAL FOR OPTICAL APPARATUS

(75) Inventors: Takao Ogawa, Tokyo (JP); Ryo Sakurai, Tokyo (JP); Noribumi Tachihara, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 09/385,574

(22) Filed: Aug. 30, 1999

(30) Foreign Application Priority Data

Sep. 2, 1998 (JP) .......................................... 10-264020

(51) Int. Cl.⁷ ............................ D04H 5/00; B32B 9/00; D02G 3/00; G03B 9/00; G03B 9/34
(52) U.S. Cl. ................... 428/292.1; 428/113; 428/220; 428/359; 396/452; 396/458; 396/483
(58) Field of Search ................................ 428/113, 220, 428/292.1, 359; 396/452, 458, 483; 354/246

(56) References Cited

U.S. PATENT DOCUMENTS

| | | | | |
|---|---|---|---|---|
| 4,775,583 A | * | 10/1988 | Kawamura ................. | 428/220 |
| 4,965,617 A | * | 10/1990 | Matsubara ................. | 396/452 |
| 4,992,813 A | * | 2/1991 | Matsubara ................. | 354/250 |
| 5,202,715 A | * | 4/1993 | Matsubara ................. | 354/246 |
| 5,283,098 A | * | 2/1994 | Matsubara ................. | 428/113 |
| 6,001,465 A | * | 12/1999 | Takahashi et al. ......... | 428/220 |
| 6,132,866 A | * | 10/2000 | Nelson et al. ............. | 428/359 |

FOREIGN PATENT DOCUMENTS

| | | |
|---|---|---|
| JP | 49-37629 | 4/1974 |
| JP | 47-126459 | 8/1974 |
| JP | 49-86466 | 2/1976 |
| JP | 53-10180 | 4/1978 |
| JP | 49-155914 | 4/1978 |
| JP | 57-60315 | 4/1982 |
| JP | 57-118226 | 7/1982 |
| JP | 58-88222 | 6/1983 |
| JP | 59-61827 | 4/1984 |
| JP | 60-95519 | 5/1985 |
| JP | 64-57247 | 3/1989 |
| JP | 64-85749 | 3/1989 |
| JP | 1-120503 | 5/1989 |
| JP | 1-178445 | 7/1989 |
| JP | 4-211232 | 8/1992 |
| JP | 4-130928 | 12/1992 |
| JP | 4-345148 | 12/1992 |
| JP | 6-160938 | 6/1994 |
| JP | 9-258297 | 10/1997 |
| JP | 9-274218 | 10/1997 |
| JP | 7-319004 | 12/1997 |
| JP | 10-158213 | 6/1998 |
| JP | 10-158417 | 6/1998 |
| JP | 10-301158 | 11/1998 |
| JP | 11-194393 | 7/1999 |

* cited by examiner

*Primary Examiner*—Rena Dye
*Assistant Examiner*—Camie S Thompson
(74) *Attorney, Agent, or Firm*—Nixon Peabody, LLP

(57) ABSTRACT

A light shielding blade material for use in an optical apparatus is constructed by a substrate composed of a plastic film having a pair of surfaces opposed to each other. A shield coating capable of blocking an incident light is formed on each surface of the substrate. A reinforcement member is disposed on each shield coating. The reinforcement member is composed of a thermosetting resin prepreg sheet reinforced with fibers arranged in an alignment direction, and hardened to laminate with the substrate through the shield coating. A lubricant coating having a black appearance and a lubricity sufficient to suppress a surface friction is formed on each reinforcement member such that an upper layer of the lubricant coating and a lower layer of the shield coating are separated from each other by an intermediate layer of the reinforcement member.

6 Claims, 5 Drawing Sheets

- 3 black lubricant coat
- 2 light shield coat
- 1 plastic
- 2 light shield coat
- 3 black lubricant coat thermoset resin, C fibers
paint resin, C black paint resin, C black

- 3 black lubricant coat — carbon black
- 4 reinforcement members — no C black
- 2 light shield coat
- 1 plastic — biaxially stretched
- 2 light shield coat
- 4 reinforcement members
- 3 black lubricant coat

LIGHT SHIELDING BLADE MATERIAL FOR OPTICAL APPARATUS

BACKGROUND OF THE INVENTION

1. Field of the Invention

The present invention relates to a light shielding blade material for use in an optical apparatus that requires a blade having a good light shielding property, a light weight and a high rigidity for use as a shutter blade in a focal plane shutter or a lens shutter, or for use as a diaphragm blade of a camera.

2. Description of the Related Art

A blade such as a shutter blade and a diaphragm blade for use in an optical apparatus such as a camera must be light in weight and must be high in rigidity, because the blade runs and stops in an extremely short time at a fast speed. Also, the blade must intrinsically have a good light shielding property, because the blade covers photosensitive materials such as a photographic film at the front side thereof to block an incident light from impinging onto the photosensitive materials. Besides, the blade must have a good lubricity for a smooth operation, because a plurality of blades are generally arranged to overlap with each other and to operate in the overlapping state. Further, the blade must have a low surface reflectivity and a good planarity to prevent the incident light from leaking through a clearance between the blades. The planarity is also important for preventing a breakage due to a collision between the blades during operation.

Disclosures of prior art references will be described briefly. Japanese Examined (Granted) Utility Model Publication No. 53-12192 discloses a technique to obtain a practical light shielding property by laminating a metal film on a shutter film of an optical apparatus by means of vapor deposition or sputtering in case that the light shielding property of the shutter film is insufficient. Japanese Patent Laid-Open Publication (Tokkai) No.49-84232 discloses that a thin thermosetting resin sheet reinforced with carbon fibers is applied to the shutter blade and that a black pigment such as a carbon black is added to the matrix resin to obtain the practical light shielding property. Japanese Patent Laid-Open Publication No. 51-14969 discloses a laminate structure of carbon fiber reinforced composite resin sheets having less warping. Japanese Patent Laid-Open Publication No. 53-101080 discloses a carbon fiber reinforced composite resin laminate, which is light in weight and which has a high strength, a high elasticity, a high impact resistance and a vibration damping property, and suggests that the carbon fiber reinforced composite resin laminate has suitable properties as a light shielding blade for use in an optical apparatus such as a camera that repeats a high speed operation of run and stop. Japanese Patent Laid-Open Publication No. 59-61827 discloses a composite member used for the light shielding blade comprising a core layer with tiny cavities and surface layers. At least, one of the core and the surface layers is reinforced with continuous carbon fibers. Further, the Publication teaches that a black die and a carbon particulate are added to a carbon fiber reinforced plastic (CFRP) matrix resin in case that the light shielding property is insufficient. Japanese Patent Laid-Open Publication No. 64-85749 discloses a blade material comprising a biaxially stretching plastic film substrate having different thermal contraction factors between a primary stretching direction and a secondary stretching direction, and a carbon fiber reinforced resin sheet is applied to both surfaces of the substrate. According to the Publication, the lamination structure is constituted so that a direction with a great thermal contraction factor (i.e., the primary stretching direction) of the substrate is substantially orthogonal to an alignment direction of the carbon fibers contained in the carbon fiber reinforced resin. Japanese Patent Laid-Open Publication No. 57-60315 discloses a shatter blade used in a camera and made of a plurality of crystal polymer compound film layers such as polyester film layers and at least one metal layer interposed therebetween as a light shielding means. The Publication teaches that one or more of coating films containing, for example, a black paint may be interposed between the plastic films as a light shielding means. Also, the Publication discloses that a black pigment or a black die may be added to at least one of the plastic films. Japanese Patent Laid-Open Publication No.57-118226 discloses a plastic blade used for an optical apparatus and made by coating a biaxially stretching polyester film with a thermosetting mat paint and by adhering an anti-electrostatic agent. The biaxially stretching polyester film has a thickness of approximately 100 $\mu$m or less, and has an optical density of approximately 10 when the film thickness has approximately 70 $\mu$m. Japanese Patent Laid-Open Publication No. 9-274218 discloses that a light shielding film is made by using a film mainly containing a thermosetting resin as a substrate film, and by applying a thermosetting resin layer containing a carbon black, a lubricant and a delustering agent to both surfaces of the film. As the substrate film, a biaxially stretching polyethylene terephthalate (PET) film containing a carbon black is used to obtain the good light shielding property.

In general, the light shielding blade for the optical apparatus requires a good light shielding property, a light weight, a high rigidity, and other properties such as mechanical properties, thermal properties, chemical properties and physical properties, planarity, workability (i.e., serviceability), and a long lifetime (i.e., corrosion resistance). Upon application of a plastic film material or a carbon fiber reinforced composite resin material to the light shielding blade for the optical apparatus, the most important property is practically the light shielding property. A light shielding plastic blade containing a black pigment such as carbon black with a good light shielding property has been practically used. For example, the carbon black is added to a PET film to provide a black PET film material having a film thickness of 50 to 125 $\mu$m with the excellent light shielding property and no pinholes, and having an optical density of 8 or more. Further, a light shielding blade for an optical apparatus in which a black lubricant coating is formed on the black PET film material is practically used, as disclosed, for example, in Japanese Patent Laid-Open Publication No. 9-274218 as described above. However, such a black PET film obtained by adding a high concentration of the carbon black to adjust the optical density of 8 or more is extremely special and expensive. A film material having the optical density of 8 or less available in a relative low price cannot be used as a blade for a purpose of shielding an incident light. In this case, it is required to form a metal film by vapor deposition, sputtering or wet plating and further to form a black lubricant coating on the metal film, as is disclosed in Japanese Examined (granted) Utility Model Publication No. 53-12192 described above. Traditionally, a paint coating cannot shield the light completely, and a metal film should be used to obtain the perfect shield of the light.

Upon applying a plastic film material to a light shielding blade for an optical apparatus, the planarity is another important feature as well as the light shielding property described above. One significant problem is a low yield caused by a poor planarity in applying a carbon fiber composite resin laminate (CFRP) to the light shielding blade for the optical apparatus. In addition, the CFRP has an insufficient light shielding property due to kink of the fibers. To improve the light shielding property, the carbon black may be kneaded into the matrix resin. However, a prepreg sheet in which the carbon black is kneaded in a specially high grade and a laminate obtained from such a prepreg sheet are quite expensive.

SUMMARY OF THE INVENTION

To solve the above-mentioned conventional problems, the following measures are taken. Namely, a plastic light shielding blade material for an optical apparatus according to the present invention comprises a plastic film substrate, light shield coatings disposed on both surfaces of the plastic film substrate, and black lubricant coatings disposed on the light shield coatings through respective reinforcement members. Namely, the reinforcement members are interposed between the light shield coatings and the black lubricant coatings to obtain a laminate structure. The reinforcement members are composed of thermosetting resin prepreg sheets laminated and hardened during fabrication of the light shielding blade material. The reinforcement member is reinforced with continuous fibers drawn in an alignment direction. By such a manner, an upper layer of the lubricant coating and a lower layer of the shield coating are separated from each other by an intermediate layer of the reinforcement member. Preferably, the drawn continuous fibers contained in the reinforcement member disposed on the substrate are aligned in parallel to those contained in the other reinforcement member. The substrate comprises a biaxially stretching plastic film. The primary stretching direction can be set freely relative to the alignment direction of the continuous fibers. Preferably, the light shield coating is composed of a paint resin containing carbon black, and the reinforcement member is composed of a thermosetting resin containing no carbon black. Preferably, the reinforcement member is reinforced with carbon fibers. Otherwise, the reinforcement member may be reinforced with polyparaphenylene benzobisoxazole fibers. Preferably, the substrate comprises a transparent plastic film having an optical density of zero or a non-transparent plastic film kneaded with carbon black and having an optical density of 8 or less. As the substrate, a polyethylene terephthalate film, a polyethylene naphthalate film or an aramid film is used. Preferably, the light shield coating contains 20 to 45% by weight of carbon black. A sum of the optical density of one light shield coating and the optical density of the substrate is 6 or more. A total optical density of the inventive laminate structure including both of the light shield coatings is 12 or more. In case that the substrate has a less adhesion to the light shield coatings, the substrate may be treated to improve adhesiveness such as a primer treatment, a plasma treatment, a chemical conversion treatment and a blast treatment.

According to the present invention, the biaxially stretching plastic film having a thickness of, for example, 12 to 125 $\mu$m is used as the substrate of the light shielding blade material for the optical apparatus. To assure the light shielding property required for the optical apparatus, the resin coating i.e., the light shield coating, is comprised of epoxy, diallylphthalate, acrylic, urethane, vinyl chloride or vinyl acetate, containing 20 to 45% by weight of carbon black as a dried film. The light shield coating is formed on both surfaces of the biaxially stretching plastic film in a thickness of 2 to 8 $\mu$m by dipping or coating using a roll coater. A total thickness of the resin coatings is in the order of 4 to 16 $\mu$m. The substrate, the light shield coatings and the lubricant coatings constitute the laminate having a total optical density in the order of 12 or more. Even after peeling one side of the light shield coatings and one side of the lubricant coatings, the total optical density maintains 6 or more. The plastic light shielding blade material for the optical apparatus that satisfies both the light weight and the optical shielding property can be thus obtained. The light shield coatings are located under the black lubricant coatings. Accordingly, a loss of the light shielding property is never created due to abrasion during a shutter operation. Normally, the plastic film substrate does not satisfy a required strength singly, hence carbon fiber composite thin sheets are, for example, used as the reinforcement members. The intermediate reinforcement member is interposed between the upper lubricant coating and the lower shield coating to allocate different functions to these separate layers. Namely, the shield coating performs the optical blocking function while physically protected by the reinforcement member, and the lubricant coating performs the lubricating function to reduce a surface friction during a shutter operation. There is no need to knead carbon black into a matrix resin of a prepreg sheet of the carbon fiber composite reinforcement member. With the light shield coatings described above alone, the complete light shielding property can be obtained. Thus, the light shield coatings formed on both surfaces of the film substrate can ensure the light shielding property required for the optical apparatus such as a camera. Consequently, there is no need to add carbon black and the like to the substrate to achieve the required light shielding property. Furthermore, there is no need to use a metal film to ensure the light shielding property, thereby realizing a reduction of weight.

DESCRIPTION OF PREFERRED EMBODIMENTS

Figure 1A:
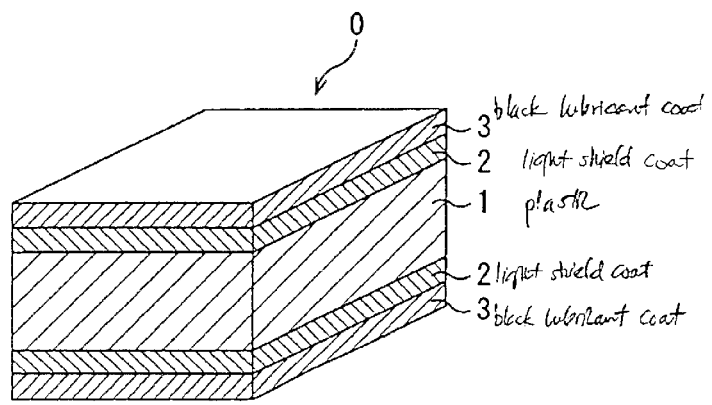
FIG. 1A is a schematic perspective view of a light shielding blade material of a basic type.

Referring to the drawings, embodiments of the present invention will be described in detail. FIG. 1A is a schematic perspective view showing a basic embodiment of the plastic light shielding blade material for the optical apparatus. As shown in FIG. 1A, the light shielding blade material 0 comprises a plastic film substrate 1, a pair of light shield coatings 2 formed on both surfaces of the plastic film substrate 1 and a pair of black lubricant coatings 3 formed on both of the light shield coatings 2. In this laminate structure, the black lubricant coatings 3 are directly laminated onto the light shield coatings 2. As the substrate, a transparent plastic film 1 having an optical density of 0 is used. Alternatively, a non-transparent film 1 having an optical density of 8 or less and being kneaded with carbon black may be used. In case of the optical density is 8 or less, commercially available general plastic films can be adopted in low costs. Examples of materials of the plastic film 1 include a polyethylene terephthalate film, a polyethylene naphthalate film and an aramid film. The light shield coatings 2 typically contain 20 to 45% by weight of carbon black. A sum of the optical density of one light shield coating and the optical density of the substrate is in the order of 6 or more. A total optical density including both of the light shield coatings is in the order of 12 or more. The optical density of 12 or more allows the blade material for the optical apparatus to achieve the practically sufficient light shielding property.

Figure 1B:
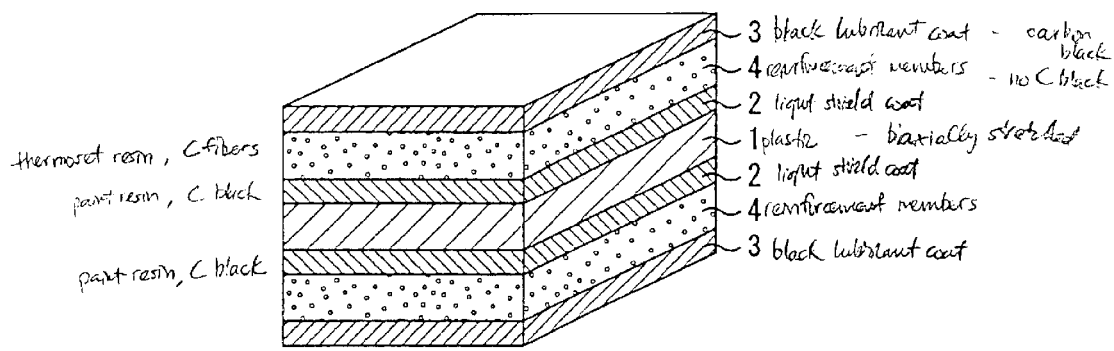
FIG. 1B is a schematic perspective view of a light shielding blade material according to the present invention.

FIG. 1B is a schematic sectional view showing a practical embodiment of the plastic light shielding blade material for the optical apparatus according to the present invention. The same reference numbers are attached to the same portions shown in FIG. 1B. In this embodiment, a pair of reinforcement members 4 are interposed respectively between the light shield coatings 2 formed on opposite surfaces of the substrate 1 and the black lubricant coatings 3 in a laminate structure. The reinforcement member 4 is made of a prepreg sheet comprising a thermosetting resin that is reinforced with continuous fibers drawn in an alignment direction. The prepreg sheet is laminated and hardened on the substrate 1. In both of the reinforcement members 4 sandwiching the substrate 1 therebetween, the alignment directions of the continuous fibers are parallel to each other. The substrate comprises a biaxially stretching plastic film 1, which is stretched in primary and secondary directions orthogonal to each other. The primary stretching direction can be freely set relative to the alignment direction of the continuous fibers. For example, the primary stretching direction of the plastic film 1 may be set orthogonal or parallel to the alignment direction of the continuous fibers. In this embodiment, the light shield coatings 2 are composed of a paint resin containing carbon black, and the reinforcement members 4 are composed of a thermosetting resin containing no carbon black. In this embodiment, the reinforcement members 4 are reinforced with carbon fibers. Alternatively, the reinforcement members 4 reinforced with polyparaphenylene benzobisoxazole fibers may be used.

Figure 2A:
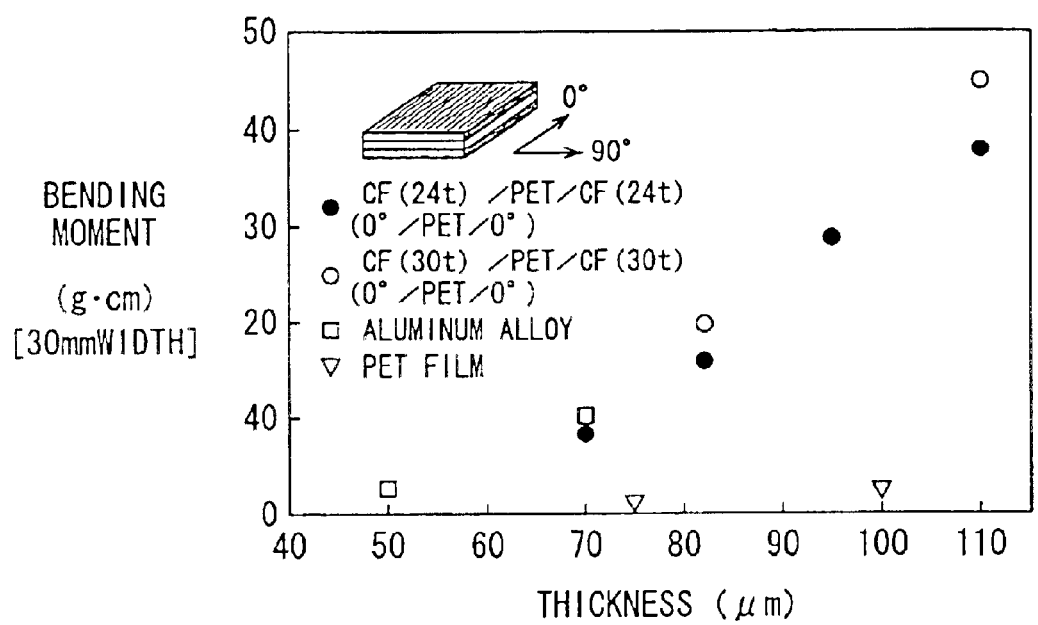
FIG. 2A is a graph showing mechanical properties of the light shielding blade material.
Figure 2B:
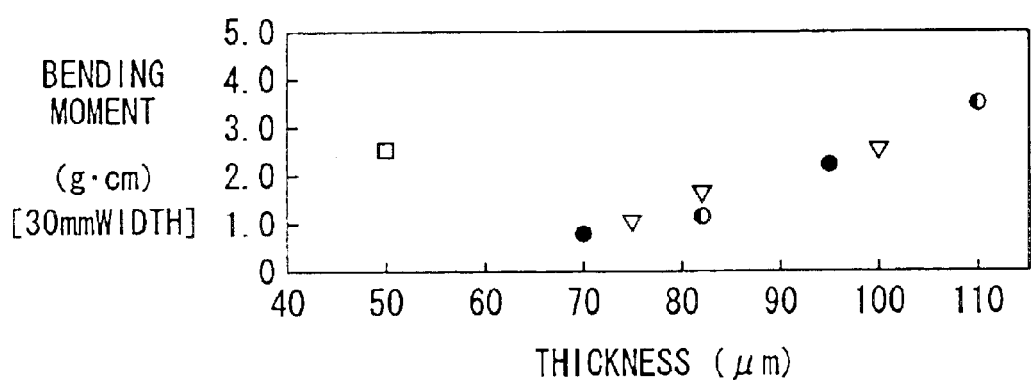
FIG. 2B is a graph showing mechanical properties of the light shielding blade material.

FIGS. 2A and 2B are graphs showing mechanical properties of various light shielding blade materials reinforced with reinforcement members. In the graphs, solid round dots represent a polyethylene terephthalate (PET) film having a thickness of 25 to 50 $\mu$m and sandwiched with a pair of carbon fiber reinforced plastic sheets (CFRP) having elastic modulus of 24 t and a carbon fiber amount of 19 g/m$^2$. The alignment direction of the carbon fibers is defined as an angle of 0 degree, and an orthogonal direction to the alignment direction is defined as an angle of 90 degree. Void round dots represent a PET film blade material having a thickness of 25 to 50 $\mu$m and sandwiched with a pair of carbon fiber reinforced plastic sheets (CFRP) having elastic modulus of 30 t and a carbon fiber amount of 19 g/m$^2$. Void square dots represent an aluminum alloy blade material, and void triangle dots represent a PET film blade material alone. In FIG. 2A, the horizontal axis represents a thickness and the vertical axis represents a bending moment in the 0 degree direction. In the 0 degree direction, by reinforcing the PET film with the carbon fibers, the substantially same level of mechanical strength as the aluminum alloy blade material can be obtained. FIG. 2B is a graph showing a bending moment in the 90 degree direction for respective samples. In the 90 degree direction, there is no special reinforcing effect caused by the carbon fibers.

Figure 3:
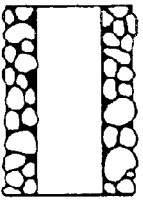
FIG. 3 is a table diagram comparing the light shielding blade material of the present invention with a conventional light shielding blade material.

FIG. 3 is a table diagram comparing the light shielding blade materials of the present invention with conventional light shielding blade materials. In upper rows, plastic blade materials using no reinforcement member are shown, and in lower rows, plastic blade materials reinforced with carbon fibers are shown. In left columns, the conventional samples are shown, and in right columns, the inventive samples are shown. Each blade material may comprise a biaxially stretching plastic film A, a continuous carbon fiber reinforced resin film B, a light shield coating C and a lubricant coating D. A suffix numeral 1 indicates that a sufficient light shielding property is ensured, and a suffix numeral 2 indicates that a less or poor light shielding property is obtained. For example, A1 represents a biaxially stretching plastic film having a sufficient light shielding property, and A2 represents a biaxially stretching plastic film having an insufficient light shielding property. A conventional blade material (1) comprises a biaxially stretching plastic film substrate A1 having a sufficient light shielding property, and lubricant coatings D2 formed on both surfaces of the substrate. Such a plastic film A1 is provided in a special grade and expensive. Another conventional blade material (2) comprises a biaxially stretching plastic film substrate A2 having a less light shielding property, and lubricant coatings D1 having a sufficient light shielding property formed on both surfaces of the substrate. In the construction of the conventional blade material (2), the lubricant coatings D1 may be easily peeled off by scratching and a pinhole may be produced therein. On the other hand, a blade material (3) according to one embodiment of the invention comprises the substrate A2, the lubricant coatings D2 and the light shield coatings C1 having a sufficient light shielding property disposed between the substrate A2 and each of the lubricant coatings D2. Specifically, the light shield coatings C1 have the good light shielding property themselves. In other words, the light shield coatings C1 are interposed between the substrate A2 and the lubricant coatings D2 for exclusively shielding the light, thereby keeping a light weight and allowing the sufficient light shielding property. As the substrate, an inexpensive plastic film having no special light shielding property can be used.

A conventional blade material (4) comprises the substrate A2, the lubricant coatings D2, and the continuous carbon fiber reinforced resin layers B1 interposed between the substrate A2 and each of the lubricant coatings D2. In the conventional blade material (4), the light shielding property can be obtained by adding a great amount of carbon black in the continuous carbon fiber reinforced resin layers B1. Such a carbon fiber reinforced resin is provided in a special grade and is extremely expensive. Another conventional blade material (5) has the same structure, but uses the lubricant coatings D1 having the sufficient shielding property. Likewise the conventional blade material (2), the lubricant coatings D1 may have a pinhole and may be easily peeled off, resulting in a poor light shielding property. In contrast, a blade material (6) according to the practical embodiment of the invention comprises the substrate A2, the continuous carbon fiber reinforced resin films B2, the light shield coatings C1 interposed between the substrate A2 and the resin films B2, and the lubricant coatings D2. The use of the light shield coatings C1 assures the good light shielding property of the blade material. As to the continuous carbon fiber reinforced resin layers B2, it is not required to use a special grade expensive resin containing a great amount of carbon black.

Examples of light shielding plastic blade materials for an optical apparatus according to the present invention and Comparative Examples will be described below in detail. First of all, methods for measuring various parameters used for evaluation of Examples and Comparative Examples will be described. The optical density is measured using a spectrophotometer SS-25 manufactured by Nippon Spectral Co., Ltd. A measuring limit is up to the optical density of 12 (transmittance of $10^{-12}$). In the measurement of the optical density, in case that the substrate is a black film or a carbon fiber reinforced prepreg, a specific care is taken when a total optical density of the laminate including the substrate film, the carbon fiber reinforced films, the light shield coatings and the black lubricant coatings is 12 or more. Namely, a first step is taken that a first optical density of the substrate film or the carbon fiber reinforced film is determined. Then, a second step is taken that a second optical density of a transparent film substrate instead of the black film substrate or the carbon fiber reinforced film and the coatings formed thereon is determined. Finally, a third step is taken that the first optical density and the second optical density are added to give the total optical density. In case that the substrate is a transparent film, when a total optical density of the substrate film, light shield coatings and black lubricant coatings is 12 or more, an optical density at one side of the substrate is measured, and the measured value is doubled to give the total optical density.

A film exposure test (light leak test to a photographic film) is conducted as follows: sample light shielding materials are incorporated into a shutter blade of a single-lens reflex camera. Then, light having an illumination intensity of 100,000 lux from a halogen lamp light source is irradiated to the shutter blade for 5 seconds, 10 seconds, 30 seconds, 1 minute, 3 minutes, 5 minutes, 10 minutes, 15 minutes, 30 minutes and 60 minutes under the condition that lens of the camera is taken out to determine whether or not the photographic film is sensitized. If the photographic film having ISO sensitivity of 800 is not sensitized for 30 minutes or more, it is recognized that the blade material can be practically adopted.

EXAMPLE 1

A blade material having exposed black lubricant mat coatings and having a total thickness of 45 μm was obtained by forming shield coatings containing 33% by weight of carbon black each having a thickness of 5 μm (total 10 μm) on both surfaces of a transparent PET film substrate (optical density of 0) having a thickness of 25 μm, and by forming black lubricant mat coatings each having a thickness of 5 μm (total 10 μm) on both surfaces of the shield coatings. The resultant blade material had an optical density of 13.0 (6.5 after one side of the coatings was peeled) and had no pinholes. As a result of the photographic film exposure test, no harmful sensitizing occurred. The light shielding material was die-cut into a blade shape and was incorporated into a digital camera as a diaphragm blade to evaluate optical properties. Flare phenomenon that might be conventionally produced at ends of the blade at a shutter speed of 1/10000 seconds was not observed, and excellent diaphragm blade properties were obtained. After 10000 times of operation, no abnormalities such as peeling of the coating were observed, thereby proving excellent diaphragm blade properties.

EXAMPLE 2

A blade material having exposed black lubricant mat coatings and having a total thickness of 70 μm was obtained by forming shield coatings containing 33% by weight of carbon black each having a thickness of 5 μm (total 10 μm) on both surfaces of a transparent PET film substrate (optical density of 0) having a thickness of 50 μm, and by forming black lubricant mat coatings each having a thickness of 5 μm (total 10 μm) on both surfaces of the shield coatings. The resultant blade material had an optical density of 13.0 (6.5 after one side of the coatings was peeled), and had no pinholes. As a result of the photographic film exposure test, no harmful sensitizing was observed. The blade material was die-cut into a blade shape and was incorporated into a camera as a lens shutter blade to evaluate shutter properties. The shutter properties were the same level as the existing shutter. The coatings of the blade material were inspected after 50,000 times of durability test. As a result, a decrease in light shielding property caused by chipping the coatings was not observed.

EXAMPLE 3

A blade material having exposed black lubricant mat coatings and having a total thickness of 70 μm was obtained by forming shield coatings containing 33% by weight of carbon black each having a thickness of 5 μm (total 10 μm) on both surfaces of a black PET film substrate (optical density of 2) having a thickness of 50 μm, and by forming black lubricant mat coatings each having a thickness of 5 μm (total 10 μm) on both surfaces of the shield coatings. The resultant blade material had an optical density of 15.0 (8.5 after one side of the coatings was peeled) and had no pinholes. As a result of the photographic film exposure test, no harmful sensitizing occurred. In addition, one side of the coatings was intentionally scratched in the depth of the substrate. As a result of the photographic film exposure test, no harmful sensitizing occurred even after scratching. The blade material was die-cut into a blade shape and was incorporated into a camera as a lens shutter blade to evaluate shutter properties. The shutter properties were the same level as the existing shutter. The coatings of the blade material were inspected after 50,000 times of the durability test. As a result, a decrease in the light shielding property caused by chipping of the coatings or else was not observed.

EXAMPLE 4

A blade material having exposed black lubricant mat coatings and having a total thickness of 93 μm was obtained by forming shield coatings containing 33% by weight of carbon black each having a thickness of 4 μm (total 8 μm) on both surfaces of a black PET film substrate (optical density of 3) having a thickness of 75 μm, and by forming black lubricant mat coatings each having a thickness of 5 μm (total 10 μm) on both surfaces of the shield coatings. The resultant blade material had an optical density of 14.0 (8.5 after one side of the coatings was peeled) and had no pinholes. As a result of the photographic film exposure test, no harmful sensitizing occurred. In addition, one side of the coatings was intentionally scratched to a depth of the substrate. As a result of the photographic film exposure test, no harmful sensitizing occurred even after the scratching of the one side. The material was die-cut into a blade shape and was incorporated into a focal plane shutter to evaluate shutter properties. The shutter properties were the same level as the existing shutter. The coatings of the blade material were inspected after 50,000 times of the durability test. As a result, a decrease in light shielding property caused by chipping of the coatings or else was not observed.

EXAMPLE 5

An excellent light shielding blade material having an exposed black lubricant mat coating, with a total thickness of 145 μm and a total optical density of 12 or more DJ was obtained by forming shield coatings containing 45% by weight of carbon black each having a thickness of 5 μm (total 10 μm) on both surfaces of a black PET film substrate (optical density of 5) having a thickness of 125 μm, and by forming black lubricant mat coatings each having a thickness of 5 μm (total 10 μm) on both surfaces of the shield coatings. The blade material was die-cut into a blade shape and was incorporated into a focal plane shutter of a camera to evaluate shutter properties. The shutter properties were the same level as the existing shutter. The coatings of the blade material were inspected after 50,000 times of the durability test. As a result, a decrease in light shielding property caused by chipping of the coatings was not observed.

EXAMPLE 6

A blade material having exposed black lubricant mat coatings and having a total thickness of 70 μm was obtained by forming shield coatings containing 33% by weight of carbon black each having a thickness of 5 μm (total 10 μm) on both surfaces of a transparent polyethylene naphthalate (PEN) film substrate (optical density of 0) having a thickness of 50 μm, and by forming black lubricant mat coatings each having a thickness of 5 μm (total 10 μm) on both surfaces of the shield coatings. The resultant blade material had an optical density of 13.0 (6.5 after one side of the coatings was peeled) and had no pinholes. As a result of the photographic film exposure test, no harmful sensitizing occurred. The material was die-cut into a blade shape and was incorporated into a focal plane shutter to evaluate shutter properties. The shutter properties were the same level as the existing shutter.

EXAMPLE 7

An excellent light shielding blade material having an exposed black lubricant mat coating with a total thickness of 45 μm and a total optical density of 12 or more was obtained by forming shield coatings containing 45% by weight of carbon black each having a thickness of 5 μm (total 10 μm) on both surfaces of an aramid film substrate (optical density of 0) having a thickness of 25 μm, and by forming the black lubricant mat coatings each having a thickness of 5 μm (total 10 μm) on both surfaces of the shield coatings. The blade material was die-cut into a blade shape and was incorporated into a lens shutter. After 10,000 times of the shutter operation, no abnormalities were observed. An example of the aramid film includes a para-type aromatic polyamide. The para-type aromatic polyamide may be poly(p-phenylene terephthalic amide) having a p-(para) bond, which is one of aromatic polyamides obtained by a condensation polymerization reaction of terephthalic chloride and p-phenylene diamine. Conventionally, the poly(p-phenylene terephthalic amide) has been obtained as underwater yarns by dissolving poly(p-phenylene terephthalic amide) in a sulfuric acid solution. Thus, poly(p-phenylene terephthalic amide) has been obtained only as the yarns. Recent technical developments realize forming of a uniform film. For example, such a film is commercially available under the trade name of Microtron from Toray Co., Ltd.

EXAMPLE 8

An excellent light shielding blade material having an exposed black lubricant mat coating with a total thickness of 70 μm and a total optical density of 12 or more was obtained by forming shield coatings containing 45% by weight of carbon black each having a thickness of 5μm (total 10 μm) on both surfaces of a black PET film substrate (optical density of 3) having a thickness of 75 μm, and by forming black lubricant mat coatings each having a thickness of 5 μm (total 10 μm) on both surfaces of the shield coatings.

EXAMPLE 9

A laminate having a thickness of 80 μm was obtained by forming shield coatings containing 33% by weight of carbon black each having a thickness of 5 μm (total 10 μm) on both surfaces of a black PET film substrate (optical density of 1) having a thickness of 25 μm. Then, prepregs not colored by carbon black and each containing continuous carbon fibers at an amount of 19 g/m$^2$ and a matrix resin at an amount of 19 g/m$^2$ are disposed on both of the shield coatings while arranging the alignment direction of the carbon fibers substantially identical to the primary stretching direction of the PET film. The prepregs are laminated to the substrate through each shield coating by hot pressing. Lubricant black mat coatings each having a thickness of 5 μm (total 10 μm) were formed on both surfaces of the resultant laminate to obtain a blade material having a total thickness of 90 μm. The resultant blade material had an optical density of 12 or more (11 after the light shield coatings were formed) and had no pinholes. As a result of the photographic film exposure test, no harmful sensitizing occurred. Stiffness of the obtained mold sheet was measured. The bending moment in the fiber alignment direction of the mold was 22 g-cm (width of 38 mm), and the bending moment in the direction orthogonal to the fiber alignment direction was 2.3 g-cm (width of 38 mm). Flatness of a blade obtained by die-cutting the resultant blade material was within 0.2 mm and was very excellent. The blade was incorporated into a focal plain shutter to evaluate shutter properties. A shutter speed of $1/12,000$ seconds was achieved. After 100,000 times of the durability test, no abnormalities such as delamination and crack were observed. According to the present invention, the light shielding blade material uses a biaxially stretching plastic film as a substrate having a thickness of 12 to 150 μm and an optical density of 8 or less. In case that the rigidity of the substrate is insufficient, two prepregs reinforced with the continuous fibers are used as a high elastic portion of the blade material according to this Example. The prepreg sheet has a thickness of 10 to 15 μm, a carbon fiber amount of 5 to 150 g/m$^2$, and tensile modulus of 23,000 to 35,000 kg/mm$^2$. The primary stretching direction of the biaxially stretching plastic film may be parallel or orthogonal to the alignment direction of the continuous carbon fibers. To secure the light shielding property, carbon black is not added to the high elastic member (the reinforcement member), and the light shield coatings are formed on both surface of the substrate to obtain the optical density of 4 to 12 at each side. Further, lubricant coatings having an anti-scratching property, a low luster property, a lubricant property and an anti-electrostatic property are formed on both surfaces of the high elastic members in a thickness of 1 to 8 μm. The plastic light shielding blade material having a total thickness of 40 to 150 μm and having the good flatness, the good light shielding property and the good high rigidity can be thus obtained.

EXAMPLE 10

The alignment direction of the carbon fibers was orthogonal to the primary stretching direction of the substrate in this example. Various properties of the laminate were the same as Example 9. Flatness of a blade obtained by die-cutting the laminate into a blade shape was 0.2 mm or less. In view of the above, it is confirmed that the flatness of the blade is excellent when the primary stretching direction of the substrate film is either parallel or orthogonal to the alignment direction of the carbon fibers.

Another laminate was obtained as Example 9 such that the substrate was made of Crashin paper having a thickness of 25 μm. Flatness of a blade obtained by die-cutting the laminate into a blade shape was 0.2 mm or less. It is confirmed that the flatness of the blade is excellent when the substrate having no extreme anisotropy as the resin film reinforced with the carbon fibers is used.

In the above-described Examples, the reinforcement member was reinforced with the carbon fibers. Alternatively, the reinforcement member may be reinforced with polyparaphenylene benzobis oxazole (PBO) fibers. The PBO fibers are made by spinning liquid crystal having a good rigidity and a molecular structure with extreme linearity. The PBO fibers have two or more times of the strength and elastic modulus compared with the para-type aramid fibers, and also have the optimum heat resistance and flame resistance among existing organic fibers. The PBO fibers are commercially available under the trade name of ZYLON from Toyobo Co., Ltd.

Comparative Example 1

A blade material was obtained by forming black lubricant mat coatings containing 9% by weight of carbon black each having a thickness of 5 μm (total 10 μm) on both surfaces of a black PET film substrate (optical density of 12) having a thickness of 75 μm. The resultant blade material had an optical density of 15.0 (13.5 after one side of the coatings was peeled off). As a result of the photographic film exposure test, no harmful sensitizing occurred. The blade material has been conventionally used, but requires an expensive special black grade film to ensure the light shielding property.

Comparative Example 2

A blade material was obtained by forming black lubricant mat coating containing 20% by weight of carbon black each having a thickness of 9 μm (total 18 μm) on both surfaces of a black PET film substrate (optical density of 8) having a thickness of 50 μm. The resultant blade material had an optical density of 17.0 (12.5 after one side of the coatings was peeled). As a result of the photographic film exposure test, no harmful sensitizing occurred. The blade material has been conventionally used especially for a high speed shutter, but requires an expensive special black grade film to ensure the practical light shielding property.

Comparative Example 3

A blade material was obtained by forming black lubricant mat coatings by dipping. The lubricant coating contains 33% by weight of carbon black and has a dried thickness of 10 μm (total 20 μm) on each surface of a black PET film substrate (optical density of 3) having a thickness of 75 μm. The resultant blade material had an optical density of 12 or more. As a result of the light leak test, light was leaked through a pinhole. Accordingly, the blade material cannot be adopted for practical use. Furthermore, a larger amount of carbon black, a delustering agent and a lubricant were contained in the dried coatings. Undesirably, the coatings became brittle and were less adhered to the substrate.

Comparative Example 4

A laminate substrate having three layers in a total thickness of 80 μm was made by forming resin layers reinforced with 65% by weight of long fibers containing 6% by weight of carbon black aligned in one direction on both surfaces of a resin substrate reinforced with 25% by weight of carbon short fibers having a length of 3 to 10 mm in one direction such that the direction of the long fibers is substantially orthogonal to the direction of the short fibers. A blade material was obtained by forming acrylic black lubricant mat coatings containing 9% by weight of carbon black each having a thickness of 5 μm (total 10 μm) on both surfaces of the laminate substrate. The resultant blade material had an optical density of 12 or more. As a result of the photographic film exposure test, no harmful sensitizing occurred. The blade material has been used for a shatter of very high speed, i.e., 1/8000 seconds or more, but requires the use of an expensive special prepreg containing carbon black in the long fiber layers.

Figure 4:
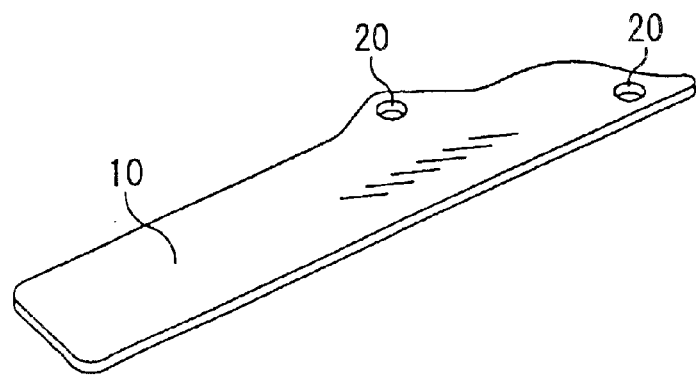
FIG. 4 is a perspective view of a focal plane shutter blade composed of the light shielding blade material according to the present invention.

FIG. 4 shows an example of a focal plane shutter blade obtained by punching the light shielding blade material shown in FIG. 1B. The shutter blade 10 has a substantially elongated shape. At one end of the shutter blade 10, a pair of holes for fixing are formed.

Figure 5:
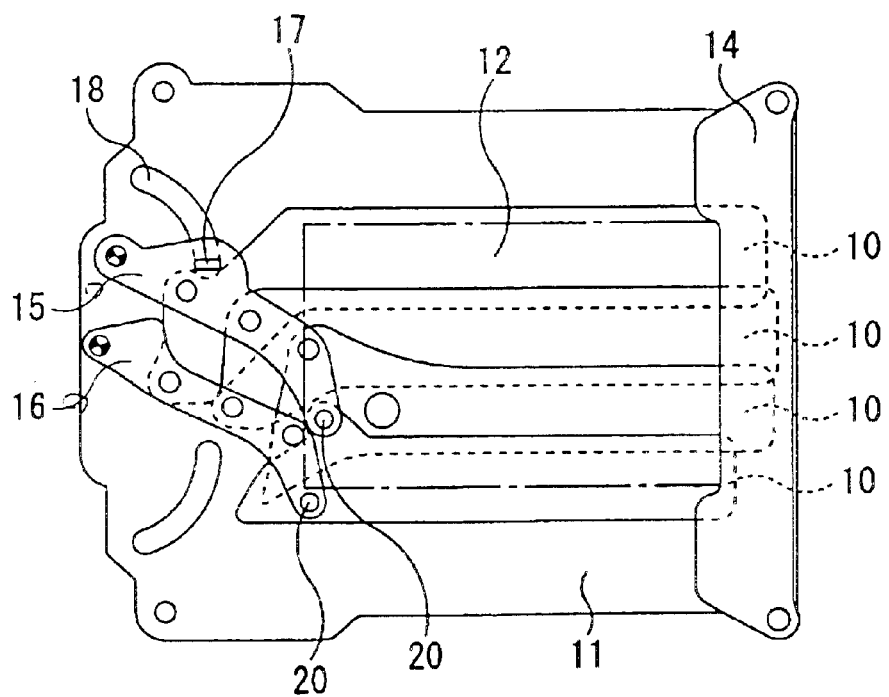
FIG. 5 is a schematic top view of a shutter assembled with the focal plane shutter blade shown in FIG. 4.

FIG. 5 shows an example of a focal plane shutter in which the focal plane shutter blade shown in FIG. 4 is incorporated. At a center of a shutter frame 11, a rectangle opening 12 is formed (as shown in a dashed line). When the focal plane shutter is closed, four front blades 10 are overlapped each other to shield the shutter opening 12. Under the front blades, rear blades (not shown) are disposed in an overlapped manner. Respective tip portions of the shutter blades are held with a blade presser 14 to inhibit un desirable movement. At a left end of the frame 11, a pair of arms 15, 16 are disposed pivotally while keeping parallel each other. The other ends of respective front blades 10 are engaged in the pair of arms 15, 16. Also, the other ends of respective rear blades (not shown) are engaged In the pair of arms 15, 16. The main arm 15 has a long hole 17. A groove 18 is disposed along a movement trace of the long hole 17 accompanied by a movement of the main arm 15. A drive pin (not shown) penetrating the frame 11 via the long groove 18 is engaged into the long hole 17. When a shutter release button (not shown) is pressed, the drive pin moves upward by a given force along the long groove 18 formed on the frame 11. Correspondingly, the main arm 15 engaged with the drive pin in the long hole 17 and the sub arm 16 interlocked with the main arm 15 pivot upward. In accordance with the pivot movement, the front blades 10 run upward in the vertical direction to open the opening 12. Subsequently, the rear blades (not shown) run upward in the vertical direction to shield the opening 12. Thus, exposure operation is completed.

Figure 6:
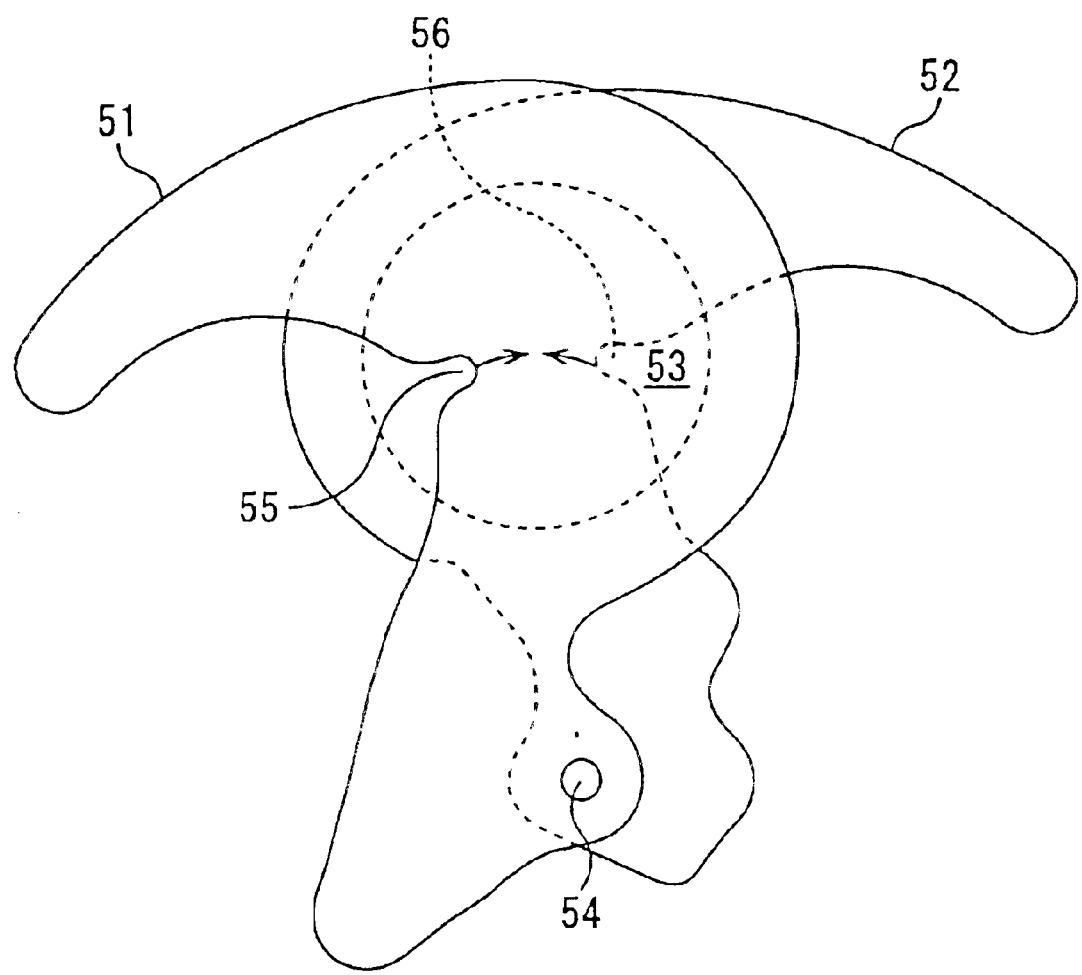
FIG. 6 is a top view of a lens shutter blade made of the light shielding blade material according to the present invention.

FIG. 6 shows a lens shutter blade produced using the inventive light shielding blade material. As shown, a pair of shutter blades 51, 52 are disposed so as to shield an opening 53. Respective shutter blades are pinned pivotably around a flucrum apart from a center of the opening in a predetermined distance. The pair of the shutter blades 51 and 52 are driven by a driving means (not shown) and run in opposite directions relative to each other to open/close the opening 53. In FIG. 6, the opening 53 is closed completely. The shutter blade 51 pivots clockwise, and the other shutter blade 52 pivots counterclockwise. Concave portions 55, 56 called tear drops are first overlapped and start to open at a center of the opening 53. If the running-of the shutter blades 51 and 52 is stopped at that time, it gives a so-called small diaphragm state. The tear drops 55 and 56 are designed to decrease errors occurring in the small diaphragm state, even though there exists unevenness in rotating angles of the shutter blades.

As described above, the light shielding blade material having the laminate structure of the present invention is produced by forming light shield coatings containing a high density of carbon black on both surfaces of a biaxially stretching film substrate, and by forming a lubricant black coatings on both sides of the light shield coatings. Further, a resin layer reinforced with carbon fibers is interposed between the light shield coating and the black lubricant coating, thereby realizing so-called a functional sharing structure. The light shield coating is disposed under the lubricant coating. Accordingly, the light shielding property is never damaged by abrasion caused by a shutter operation. Even if the resin layer reinforced with carbon fibers is used for the reinforcement member, there is no need to knead carbon black into a matrix resin of the prepreg of the reinforcement member, and a general purpose prepreg can therefore be used. There is no need to add carbon black to the film substrate to secure the light shielding property, because the light shielding property is assured exclusively by the light shield coatings formed on the surfaces of the substrate. Should the carbon fiber be added, it may be satisfactory to add a small amount thereof. The light shield coatings are made of resin coatings. Accordingly, there is less increase in weight compared with metal films such as plating film, and the resin coating is inexpensive as compared with a metal vapor deposition film. There is no limitation (especially no lower limitation) in a thickness of the blade material, and the blade material can be freely designed because the required light shielding property is obtained by the light shield coatings. Furthermore, if the blade material is made of a plastic reinforced with carbon fibers, the substrate and the reinforcement member do not need to have the light shielding property.

What is claimed is:

1. A light shielding blade material for use in an optical apparatus, comprising:
   a substrate composed of a plastic film having a pair of surfaces opposed to each other, said substrate having no reinforcing fibers;
   a shield coating being capable of blocking an incident light and being formed on each surface of the substrate, the shield coating being composed of a paint resin containing a carbon black and having no reinforcing fibers;
   a reinforcement member disposed on each shield coating, the reinforcement member being composed of a thermosetting resin prepreg sheet reinforced with fibers arranged in an alignment direction, and hardened to laminate with the substrate through the shield coating, the thermosetting resin prepreg sheet containing no carbon black; and
   a lubricant coating having a black appearance and a lubricity sufficient to suppress a surface friction, the lubricant coating being formed on each reinforcement member such that the lubricant coating and the shield coating are separated from each other by the reinforcement member.

2. The light shielding blade material according to claim 1, wherein the reinforcement member contains fibers aligned in parallel to fibers contained in the other reinforcement member, and wherein the substrate is composed of a plastic film being stretched bidirectionally in primary and secondary directions orthogonal to each other and being disposed relative to the reinforcement member such that the primary direction of the plastic film can be freely set relative to the alignment direction of the fibers.

3. The light shielding blade material according to claim 1, wherein the reinforcement member is reinforced with polyparaphenylene benzobisoxazole fibers.

4. The light shielding blade material according to claim 1, wherein the reinforcement member is reinforced with polyparaphenylene benzobisoxazole fibers.

5. The light shielding blade material according to claim 1, wherein the substrate comprises a plastic film selected from one of the group consisting of a polyethylene terephthalate film, a polyethylene naphthalate film, and an aramid film, the plastic film being free of a carbon black and having an optical density of zero, or the plastic film being kneaded with a carbon black and having an optical density of 8 or less.

6. The light shielding blade material according to claim 1, wherein each shield coating contains 20 to 40% by weight of a carbon black, such that the sum of an optical density of one shield coating and an optical density of the substrate is 6 or more, and a total optical density of a layer structure is 12 or more, including the substrate, both of the shield coatings, both of the reinforcement members and both of the lubricant coatings.

* * * * *